ововоpatented Nov. 12, 1963

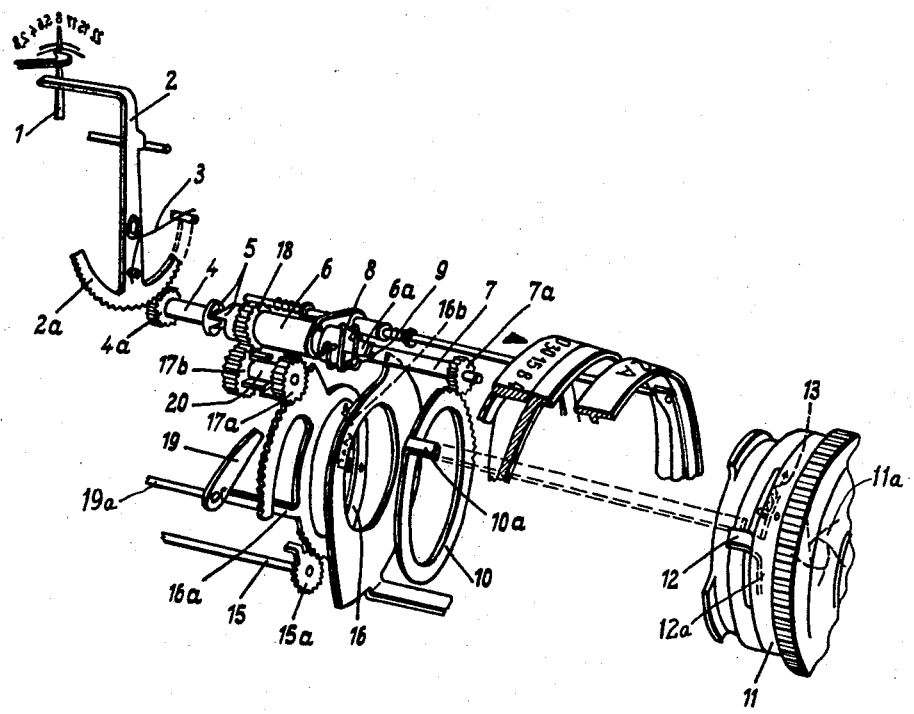

3,110,236
PHOTOGRAPHIC CAMERA
Franz Singer, Munich, Germany, assignor to Compur-Werk G.m.b.H. & Co., Munich, Germany, a firm of Germany
Filed Dec. 18, 1961, Ser. No. 159,916
Claims priority, application Germany Dec. 19, 1960
3 Claims. (Cl. 95—10)

This invention relates to a photographic camera, and more particularly to what is sometimes called an "automatic" camera, in which a built-in light meter or exposure meter controls the setting of the diaphragm aperture or the shutter speed or both.

An object of the invention is the provision of a generally improved and more satisfactory camera of this kind.

Another object is the provision of a camera in which an exposure setting element (for setting, e.g., the diaphragm aperture or the shutter speed) is spring urged toward one end or limit of its travel, and is moved in the opposite direction toward the opposite end of its range of travel in order to cock or tension the camera ready for making an exposure, and in which there is a resilient connection or coupling means between the main tensioning member and the member which moves the exposure setting element in the opposite direction, so that force applied to the main tensioning member will not damage delicate parts associated with or influenced by the exposure setting element, in case such delicate parts should accidentally jam or stick.

A further object is the provision of a camera in which there is the above mentioned resilient connection or coupling means for transmitting torque in one direction from the main tensioning member to the member which moves the setting element, in combination with a positive connection (rather than a resilient one) for transmitting torque in the opposite direction.

A still further object is the provision of the above mentioned resilient and positive connections in combination with each other, applied specifically to the movement of a setting element for setting the diaphragm aperture.

These and other desirable objects may be attained in the manner disclosed as an illustrative embodiment of the invention in the following description and in the accompanying drawing forming a part hereof, which is a schematic perspective view of those parts of a camera structure which are sufficient to enable an understanding of the invention, viewed obliquely from the front of the camera, many other parts well understood in the art being omitted for the sake of clarity and simplicity of the drawing.

The present invention may be regarded as an improvement upon known camera constructions of this same general kind, such for example as those disclosed in United States Patents 2,969,004, granted January 24, 1961, and 3,013,478, granted December 19, 1961, and copending United States patent applications 803,204, filed March 31, 1959 (now Patent 3,044,376, granted July 17, 1962), and 842,145, filed September 24, 1959 (now Patent 3,044,377, granted July 17, 1962), all in the name of Kurt Gebele. The following disclosure presupposes that the reader is already familiar with these prior constructions, particularly the ones in the issued patents.

The structure, in its illustrative embodiment, includes a pointer 1 of a photoelectric exposure meter, the pointer being mounted for oscillation coaxially with a feeler 2 which is stopped in its running-down motion by engagement with the pointer while the latter is temporarily clamped fast by known clamping mechanism when the camera is triggered or released for making an exposure. These parts may correspond in general to the pointer 60' and feeler 78 or 178 in Patent 2,969,004 (hereafter sometimes called the "first patent") or to the pointer 36 and feeler 110 in Patent 3,013,478 (hereafter sometimes called the "second patent"). One part of the feeler forms a toothed gear quadrant 2a, and the feeler is urged by a light spring 3 in a counterclockwise direction toward its initial or rest position wherein it does not obstruct the free deflection of the pointer through its range.

The teeth of the quadrant 2a mesh with a pinion 4a on a rear follow-up shaft 4 which is connected through clutch means 5 with a sleeve 6 which is both longitudinally slidable and rotatable (each to a limited extent) on a forward follow-up shaft 7. The clutch 5 is not involved in the present invention, and its presence or absence is immaterial to the present invention. It is here illustrated only because it actually exists in the preferred construction of a camera incorporating the present invention. It corresponds in purpose and function to the clutch 82, 104 in the above mentioned second patent.

The sleeve 6 constitutes one member of the resilient coupling means of the present invention. A coiled torsion spring 8 surrounds the sleeve 6. One end of the spring is connected to the sleeve. The other end is attached to a pin 9 which projects radially from the shaft 7. The spring normally holds the pin in contact with a longitudinally or axially extending edge of an axial flange or extension 6a on the forward end of the sleeve 6, this flange being long enough to overlap the pin 9 throughout the entire range of longitudinal movement of the sleeve 6 when it slides axially during engaging or disengaging movements of the clutch 5.

The front end of the forward follow-up shaft 7 carries a pinion 7a fixed to it and meshing with gear teeth on the periphery of a stop ring or setting ring 10 rotatable about the optical axis of the shutter and diaphragm assembly. This ring 10 has an arm 10a which projects axially forwardly (i.e., parallel to the optical axis) and which engages and controls the position of whatever setting element is to be set automatically by or under the influence of the exposure meter pointer 1. In the exemplary embodiment, such setting element is the aperture setting element of an adjustable diaphragm (e.g., an iris diaphragm) in a lens unit or objective unit, preferably but not necessarily a detachable and interchangeable objective unit indicated in general at 11 and having adjustable diaphragm leaves 11a. When designed to be used with such a unit, the forward end of the arm 10a lies against one side of an arm 12 on the conventional diaphragm aperture adjusting ring 12a of the objective unit 11, this ring being urged by the spring 13 toward its position of minimum aperture.

For putting the parts in cocked or tensioned position preparatory to their respective running down movements during the making of an exposure, there is a cocking shaft or tensioning shaft 15, corresponding in general to the cocking shaft 30 of the first patent and to the cocking shaft 48 of the second patent. As mentioned in those patents, the cocking shaft is turned in a tensioning direction (counterclockwise when viewed as in the present drawing) by any suitable operating connections on the camera body, preferably by the same knob or lever which operates the film feeding or film transport mechanism, this being conventional and well understood in the art. The shaft 15 is fixed to a pinion 15a which meshes with gear teeth on the periphery of a cocking or tensioning ring 16 which rotates about the optical axis, coaxially with the ring 10. Other gear teeth on another part of the periphery of the ring 16 mesh with and drive a pinion 17a which is connected by means of a one-way clutch 20 to a coaxial pinion 17b which, in turn, meshes with a pinion 18 fast on the sleeve 6. A releasable latch 19 on a shaft 19a can engage an arm 16a on the ring 16 to latch the tensioning ring 16 in its cocked or tensioned positioned. When the latch is released or unlatched (by the conventional button release on the camera body, just as the corresponding latch 32 is released in the first patent, or as the latch 62 is released in the second patent) the spring 16b connected to the tensioning ring 16 can turn the ring counterclockwise to perform its running down movement from tensioned position to rest position.

The drawing illustrates the mechanism in the rest or run-down position at the conclusion of one exposure and before the mechanism has been newly cocked or tensioned ready for the next exposure. When the camera is cocked (e.g., by winding the film) the tensioning shaft 15 is rotated counterclockwise. This serves to rotate the ring 16 clockwise, the pinions 17a and 17b counterclockwise, and the pinion 18 and sleeve 6 clockwise. If there is no unusual impediment to counterclockwise rotation of the diaphragm ring 12a, the spring 8 keeps the pin 9 tight against the edge of the flange 6a on the sleeve 6, during the clockwise rotation of the sleeve 6, so that the follow-up shaft 7 normally partakes of the full clockwise rotation of the sleeve, thereby turning the ring 10 counterclockwise, so that the arm 10a thereon moves the diaphragm ring 12a counterclockwise to its fully open or maximum aperture position, against the force of the spring 13.

However, if the parts of the diaphragm mechanism jam or fail to move in the normal way, then the resilient coupling between the parts 6 and 7 will yield or give, avoiding damage to the delicate parts of the diaphragm. No greater force can be exerted on the diaphragm than that which can be transmitted through the spring 8, and this is a relatively light spring, although amply strong to transmit the force necessary to overcome the spring 13 and the normal frictional resistance of the diaphragm parts. But under added frictional resistance, as when there is accidental jamming of the delicate diaphragm parts, the spring 8 will yield, and the sleeve 8 can complete its clockwise rotation without causing any further rotation of the shaft 7 or ring 10.

Assuming that the clutch 5 is in the engaged or closed position, the clockwise tensioning rotation of the sleeve 6 is transmitted likewise to the pinion 4a, causing counterclockwise swinging of the feeler 2 away from the meter pointer 1, thus freeing the pointer for proper movement under the influence of the conventional photocell to which it is operatively connected. At the conclusion of the tensioning movement, the latch 19 snaps behind the arm 16a on the ring 16, holding all parts in their respective tensioned positions, ready to make an exposure.

When the release button on the camera is actuated to make the exposure, the latch 19 is released, the spring 16b can turn the ring 16 counterclockwise, and the spring 13 can turn the parts 12 and 10 clockwise and the parts 7, 6, and 4 counterclockwise, possibly assisted by other springs which are unimportant for present purposes. The feeler 2 can thus turn clockwise until it is stopped by contact with the pointer 1, which is clamped fast at this time as explained in the first and second patents. When the feeler is stopped by the pointer, this stops the counterclockwise turning of the sleeve 6 and the shafts 4 and 7, but the spring 16b can continue to turn the ring 16 through its full running down movement, on account of the one-way clutch 20.

During this counterclockwise rotation of the sleeve 6 (assuming that there was no jamming of the diaphragm parts during the previous tensioning movement) the pin 9 is in tight engagement with the edge of the flange 6a, so that for movement in this direction there is a positive driving coupling of the parts, rather than a resilient or yielding connection. Hence the rings 12a and 10 will be positioned in exact accordance with the position of the feeler 2 as determined by the clamped position of the pointer 1.

The use of the resilient coupling 6a, 8, 9 actually has two advantages. It is not only protects delicate components in the objective from excessive torque, in the manner already explained, but it also allows the use of other objectives which may have a smaller range of diaphragm adjustment than the maximum range for which the camera is designed. For example, the camera may be designed with sufficient rotary movement of the parts 6, 7, 10 to open a diaphragm up from a minimum aperture of $f{:}22$ to a maximum aperture of, say, $f{:}2.0$ But the camera can still be used with a diaphragm having a smaller range of, say, $f{:}22$ to $f{:}2.8$. The counterclockwise rotation of the ring 10 will open the diaphragm up from minimum aperture to maximum aperture, and then when the diaphragm ring 12a can turn no further, the motion of the ring 10 necessarily stops, but the spring 8 of the resilient coupling can yield, thus permitting the camera tensioning mechanism to complete its full tensioning cycle. The location of the resilient coupling fairly close (in a functional sense) to the tensioning shaft 15 serves to safeguard all of the more delicate members further along the kinematic chain to the exposure setting member which is to be operated upon.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera of the type comprising an exposure meter pointer, a feeler for sensing a given position of said pointer, a spring-loaded diaphragm actuating member movable under spring power from an initial tensioned position toward a run-down position, coupling means for coupling said diaphragm actuating member to said feeler, and tensioning means for moving said coupling means in one direction to shift said actuating member to an initial tensioned position, characterized by the fact that said coupling means is resilient at a point intermediate between said diaphragm actuating member and said tensioning means, to transmit motion yieldingly from said tensioning means to said actuating member in a tensioning direction and to transmit motion rigidly in an opposite direction, whereby said tensioning means may complete its full tensioning movement without necessarily causing corresponding full movement of said diaphragm actuating member to its tensioned position in case said diaphragm actuating member may have jammed, movement of said diaphragm actuating member toward its rundown position being accomplished by its spring power so that if jammed it may remain stationary without further damage from an attempted actuation of said tensioning means.

2. A photographic camera of the type including a meter pointer, a feeler for cooperating with said pointer, a diaphragm actuating member movable through a range, a follow-up shaft operatively connecting said feeler to said actuating member so that they normally move together, and tensioning mechanism for turning said follow-up shaft to move both said feeler and said actuating member to respective starting positions, characterized by the fact that there is a sleeve rotatably mounted on said follow-up shaft, said sleeve being driven by said tensioning mechanism, a radial pin on said shaft, an entraining extension on said sleeve for engaging said pin to transmit torque unyieldingly from said sleeve to said shaft in one direction of rotation, and a coiled torsion spring having one end attached to said sleeve and the other end attached to said pin to tend to hold said pin engaged with said extension, said spring yielding to allow said pin and said extension to separate from each other during rotation in the opposite direction when excessive resistance to movement of said diaphragm actuating member is encountered.

3. A construction as defined in claim 2, wherein the available range of rotary movement of said sleeve in said opposite direction exceeds the available range of rotary movement of said follow-up shaft, so that said extension will separate from said pin during the latter part of movement in said opposite direction and will be positively entrained by said pin during movement in the first direction.

References Cited in the file of this patent

UNITED STATES PATENTS

| | | |
|---|---|---|
| 2,969,004 | Gebele | Jan. 24, 1961 |
| 3,013,478 | Gebele | Dec. 19, 1961 |